(12) United States Patent
Suemura

(10) Patent No.: US 7,706,284 B2
(45) Date of Patent: Apr. 27, 2010

(54) LINK PROPERTY SETTING METHOD, ROUTE CALCULATING METHOD AND SYSTEM USING THE SAME

(75) Inventor: Yoshihiko Suemura, Minato-ku (JP)

(73) Assignee: NEC Corporation, Tokyo (JP)

( * ) Notice: Subject to any disclaimer, the term of this patent is extended or adjusted under 35 U.S.C. 154(b) by 505 days.

(21) Appl. No.: 11/578,418

(22) PCT Filed: Apr. 14, 2005

(86) PCT No.: PCT/JP2005/007215

§ 371 (c)(1),
(2), (4) Date: Oct. 13, 2006

(87) PCT Pub. No.: WO2005/101759

PCT Pub. Date: Oct. 27, 2005

(65) Prior Publication Data

US 2007/0211732 A1    Sep. 13, 2007

(30) Foreign Application Priority Data

Apr. 14, 2004    (JP) .............................. 2004-118461

(51) Int. Cl.
*H04L 12/26* (2006.01)
(52) U.S. Cl. ...................... 370/238; 370/216; 370/221; 370/225; 370/228; 370/217
(58) Field of Classification Search ......... 370/216–228, 370/238
See application file for complete search history.

(56) References Cited

U.S. PATENT DOCUMENTS 6,378,085 B1 * 4/2002 Morinaga ....................... 714/3
2002/0131424 A1 * 9/2002 Suemura ..................... 370/400

FOREIGN PATENT DOCUMENTS

| JP | 9-116573 A | 5/1997 |
|---|---|---|
| JP | 2002-271372 A | 9/2002 |
| JP | 2003-32289 A | 1/2003 |

(Continued)

OTHER PUBLICATIONS

Panagiotis Sebos, et al. "Effectiveness of Shared Risk Link Group Auto-Discovery in Optical Networks", Thursday Morning/OFC 2002, pp. 1-3.

(Continued)

*Primary Examiner*—Huy D Vu
*Assistant Examiner*—Omer Mian
(74) *Attorney, Agent, or Firm*—Sughrue Mion, PLLC

(57) ABSTRACT

A method of setting shared risk link group identification information (SRLG ID) which is one of link properties employed for calculating a route for a path in a communications network including nodes and links for interconnecting the nodes, and indicates a link group which shares resources, comprises the step of assigning a number of SRLG IDs to the link group in accordance with a failure rate of resources shared by that link group. A route calculating method for calculating routes for a working path and a standby path comprises the step of calculating the routes such that a minimum number of SRLG IDs duplicate between all links on the route of the working path and all links on the route of the standby path.

3 Claims, 8 Drawing Sheets

FOREIGN PATENT DOCUMENTS

| | | |
|---|---|---|
| JP | 2003-229889 A | 8/2003 |
| JP | 2003-273904 A | 9/2003 |
| JP | 2003-304277 A | 10/2003 |
| JP | 2004-40384 A | 2/2004 |

OTHER PUBLICATIONS

Panagiotis Sepos, et al., "Auto-discovery of Shared Risk Link Groups", AT & T Labs-Research, Florham Park and Red Bank, NJ, USA, pp. 1-3.

J.P. Lang, et al., "RSVP-TE Extensions in support of End-to-End GMPLS-based Recovery" draft-lang-ccamp-gmpls-recovery-e2e-signaling-02.txt, CCAMP GMPS P&R Design Team, CCAMP Working Group, Internet Draft, Expiration Date: Mar. 2004, Sep. 2003, pp. 1-25.

K. Kompella, et al., "Routing Extensions in support of Generalized Multi-Protocol Label Switching", draft-ietf-ccamp-gmpls-routing-09.txt, Network Working Group, Internet Draft, Category: Standards Track, Expiration Date: Apr. 2004, Oct. 2003, pp. 1-20.

Eric Mannie, Generalized Multi-Protocol Label Switching Architecture draft-ietf-ccamp-gmpls-architecture-07.txt., Network Working Group, Internet Draft, Category: Standard Track, Expiration Date: Nov. 2003, May 2003, pp. 1-49.

Bala Rajagopalan, et al. "IP over Optical Networks: A Framework", Internet Draft draft-many-ip-optical-framework-01.txt, Expiration Date: Jan. 14, 2001, pp. 1-47.

Eiichi Horiuchi, et al., "GMPLS based Fault Recovery and Extra LSP Service utilizing protecting bandwidth", The Institute of Electronics, Information and Communication Engineers, Dec. 18, 2003, pp. 41-46.

* cited by examiner

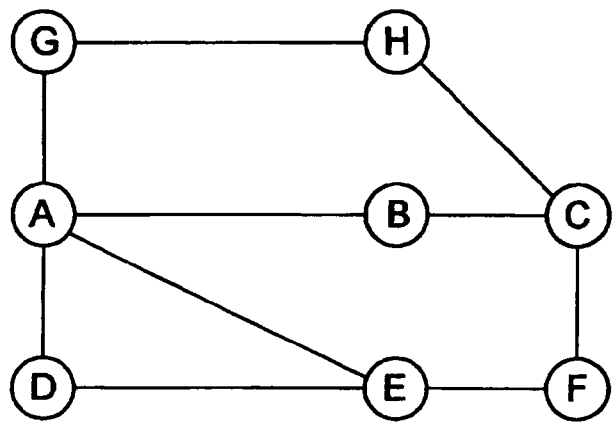
FIG. 1
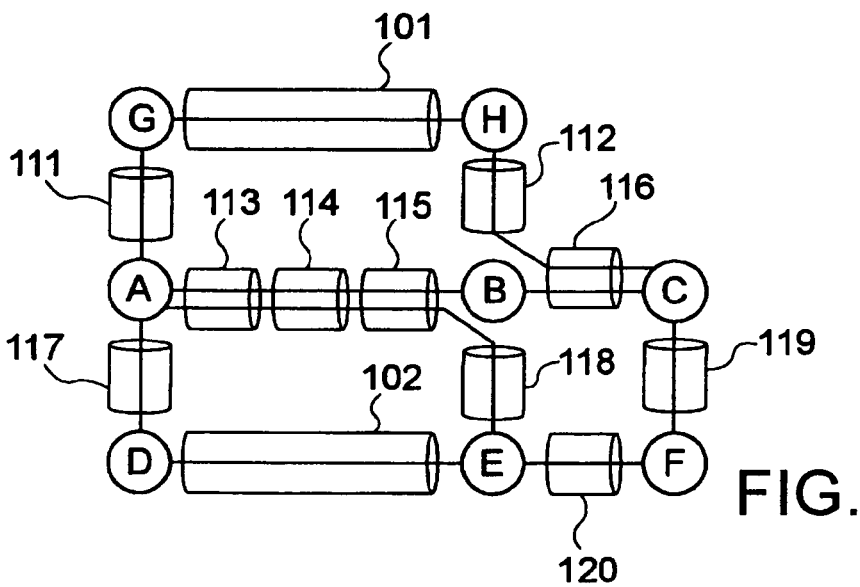
FIG. 2
| Resource | Link group | Failure rate (ppm) |
|---|---|---|
| 101 | GH | 10 |
| 102 | DE | 10 |
| 111 | AG | 3 |
| 112 | CH | 3 |
| 113 | AB, AE | 3 |
| 114 | AB, AE | 3 |
| 115 | AB, AE | 3 |
| 116 | BC, CH | 3 |
| 117 | AD | 3 |
| 118 | AE | 3 |
| 119 | CF | 3 |
| 120 | EF | 3 |
FIG. 3

| Link group | Resource group | Total failure rate (ppm) | SRLG count | SRLG group |
|---|---|---|---|---|
| GH | 101 | 10 | 5 | 201, 202, 203, 204, 205 |
| DE | 102 | 10 | 5 | 211, 212, 213, 214, 215 |
| AG | 111 | 3 | 1 | 221 |
| CH | 112 | 3 | 1 | 231 |
| AB, AE | 113, 114, 115 | 9 | 4 | 241, 242, 243, 244 _ |
| BC, CH | 116 | 3 | 1 | 251 |
| AD | 117 | 3 | 1 | 261 |
| AE | 118 | 3 | 1 | 271 |
| CF | 119 | 3 | 1 | 281 |
| EF | 120 | 3 | 1 | 291 |

| Link | SRLG group |
|------|------------|
| GH | 201, 202, 203, 204, 205 |
| AG | 221 |
| CH | 231, 251 |
| AB | 241, 242, 243, 244 |
| BC | 251 |
| AD | 261 |
| AE | 241, 242, 243, 244, 271 |
| CF | 281 |
| DE | 211, 212, 213, 214, 215 |
| EF | 291 |

LINK PROPERTY SETTING METHOD, ROUTE CALCULATING METHOD AND SYSTEM USING THE SAME

This application claims priority from PCT Application No. PCT/JP2005/007215 filed Apr. 14, 2005, and from Japanese Patent Application No. 2004-118461, filed Apr. 14, 2004, which applications are incorporated herein by reference.

TECHNICAL FIELD

The present invention relates to a link property setting method and a route calculating method in a communications network, and particularly, to a method of setting link properties for use in a route control protocol and a network management system, a method of calculating a route based on the link properties, and a system which employs these link property setting method and route calculating method.

BACKGROUND ART

GMPLS (Generalized Multi-Protocol Label Switching) is one of route control protocols for communications networks. GMPLS is described in Eric Mannie et al., "Generalized Multi-Protocol Label Switching Architecture," IETF Internet Draft, draft-ietf-ccamp-gmpls-architecture-07.txt [Non-Patent Document 1], which is an Internet draft submitted to IETF (Internet Engineering Task Force), and the like. In the following description, a communications node in a network is simply called the "node."

In a network controlled by GMPLS, each node advertises (broadcasts) the state of a TE link, which is a logical link for connecting itself with an adjacent node, to all nodes within a routing domain as link state information. This advertisement is performed using a routing protocol such as OSPF (Open Shortest Path First). The operation of the routing protocol in GMPLS is described in detail in K. Kompella et al., "Routing Extensions in Support of Generalized Multi-Protocol Label Switching," IETF Internet Draft, draft-ieff-ccamp-gmpls-routing-09.txt [Non-Patent Document 2], and the like.

The advertised link state information is stored in a link state database in each node, and used by each node for calculating a route for a path which originates from each node. Properties of a link included in the link state information are defined by K. Kompella et al. [Non-Patent Document 2], and such properties include a metric and SRLG (Shared Risk Link Group) information. The metric is a cost of the link in a route calculation, and the length of the link, distance, or a fixed value is typically used therefor. Section 2.3 of K. Kompella et al. [Non-Patent Document 2] defines SRLG that when certain links share one physical resource, and a failure in the physical resource affects the entire links, the links make up SRLG. Information for identifying SRLG is called shared risk link group identification information (SRLG ID).

For example, a plurality of optical fibers in the same pipe line are simultaneously affected by a single failure which is a disconnection of the pipe line. Otherwise, in a wavelength-multiplex optical network, a disconnection of an optical fiber affects a plurality of wavelengths in the optical fiber. SRLG is identified by SRLG ID, and one TE link can belong to a plurality of SRLGs.

SRLG information advertised by a routing protocol is a set of SRLG ID's to which the TE link belongs. The SRLG information is useful for recovering from a failure using GMPLS. A GMPLS-based failure recovery method is described in J. P. Lang et al., "RSVP-TE Extensions in support of End-to-End GMPLS-based Recovery," IETF Internet Draft, draft-lang-ccamp-gmpls-recovery-e2e-signaling-02.txt [Non-Patent Document 3], and the like. For example, a scheme called "1+1 protection" involves previously setting a working path and a standby path, and allowing data to flow both on the working path and standby path. A node at a receiving end generally receives data from the working path, but changes over a switch, when the working path fails, to receive data from the standby path, thereby recovering from the failure. Here, routes must be selected such that the working path and standby path simultaneously fail with a lowest possible probability. For this purpose, SRLG is used. Specifically, when a start point node calculates routes for a working path and a standby path, the working path and standby path are designed not to pass TE links which belong the same SRLG.

Also, J. P. Lang et al. [Non-Patent Document 3] discloses a failure restoration scheme called "Shared Mesh Restoration." In this scheme, when different standby paths pass the same route, the standby paths share resources such as a bandwidth and the like allocated to the standby paths within that section if they satisfy certain criteria. SRLG can be used to determine whether or not the resources can be shared. Assuming, for example, that there are working path 1 and working path 2, when the route of working path 1 and the route of working path 2 do not at all share SRLG, standby paths corresponding to the respective working paths share resources. When such a condition is satisfied, a failure in one resource will not result in simultaneously failures on working path 1 and working path 2, so that a single failure does not cause a contention even if the standby paths share resources.

Further, P. Sebos et al., "Auto-discovery of Shared Risk Link Groups," Optical Fiber Communication Conference (OFC) 2001, WDD3 [Non-Patent Document 4], and P. Sebos et al., "Effectiveness of Shared Risk Link Group Auto-Discovery in Optical Networks," Optical Fiber Communication Conference (OFC) 2002, pp. 493-495 [Non-Patent Document 5] disclose methods of automatically setting SRLG. According to the methods, information on positions of components such as optical amplifiers within a network is collected using GPS (Global Positioning System) and the like. A supervisory channel (monitoring channel) normally provided for monitoring and controlling optical amplifiers, and the like is used for collecting the positional information. When an optical amplifier passed by a certain link and an optical amplifier passed by a different link are disposed within the same fiber span, the two links are regarded as belonging to the same SRLG. The fiber span refers to a pipe line which is a physical resource. P. Sebos et al. [Non-Patent Document 5] defines SRLG as a "maximum set of fiber spans used by common links," and therefore one SRLG is assigned to one set of fiber spans, irrespective of its length.

However, in the prior art described above, since the SRLG is not allocated in accordance with a failure rate of shared resource(s) but in a one-to-one correspondence to the resource(s), a difference in the failure rate of resource cannot be reflected to route control. For example, a pipe line of 100 km long generally has a failure rate substantially higher than a pipe line of 100 m long. However, in the prior art, links which share a pipe line of 100 m long and links which share a pipe line of 100 km long are equally treated as individual SRLGs. Accordingly, this difference in failure rate cannot be taken into consideration in a route calculation. For example, assume that when routes are calculated for a working path and a standby path, there has not been found any route on which both do not at all share SRLG. In this event, for the second best solution, a calculation should be made to find a route on which the working path and standby path share only one SRLG, wherein SRLG corresponding to a pipe line of 100 km long is less desirable than SRLG corresponding to a pipe line of 100 m long which exhibits a lower failure rate. However, since both are treated in a similar manner in the prior art, such a selection cannot be made.

In the following, a list is described for references used in this description.

[Non-Patent Document 1]: Eric Mannie et al., "Generalized Multi-Protocol Label Switching Architecture," IETF Internet Draft, draft-ietf-ccamp-gmpls-architecture-07.txt;

[Non-Patent Document 2]: K. Kompella et al., "Routing Extensions in Support of Generalized Multi-Protocol Label Switching," IETF Internet Draft, draft-ieff-ccamp-gmpls-routing-09.txt;

[Non-Patent Document 3]: J. P. Lang et al., "RSVP-TE Extensions in support of End-to-End GMPLS-based Recovery," IETF Internet Draft, draft-lang-ccamp-gmpls-recovery-e2e-signaling-02.txt;

[Non-Patent Document 4]: P. Sebos et al., "Auto-discovery of Shared Risk Link Groups," Optical Fiber Communication Conference (OFC) 2001, WDD3;

[Non-Patent Document 5]: P. Sebos et al., "Effectiveness of Shared Risk Link Group Auto-Discovery in Optical Networks," Optical Fiber Communication Conference (OFC) 2002, pp. 493-495.

DISCLOSURE OF THE INVENTION

Problem to be Solved by the Invention

An object of the present invention is to provide a link property setting method which is capable of controlling routes of paths on reflection of a difference in failure rate between resources.

Another object of the present invention is to provide a route calculating method which is capable of controlling routes of paths on reflection of a difference in failure rate between resources.

Another object of the present invention is to provide a link property setting system which is capable of controlling routes of paths on reflection of a difference in failure rate between resources to set link properties.

Another object of the present invention is to provide a route calculating system which is capable of controlling routes of paths on reflection of a difference in failure rate between resources to calculate the routes.

Means For Solving the Problems

According to a first aspect of the present invention, there is provided a link property setting method of setting shared risk link group identification information (SRLG ID) which is one of link properties used for calculating a route for a path in a communications network including nodes and links for interconnecting the nodes, and indicates a link group which shares a resource. The method includes the step of assigning a number of SRLG IDs to each link group in accordance with a failure rate of the resource shared by the link group.

According to a second aspect of the present invention, there is provided a link property setting system for setting an SRLG ID which is one of link properties used for calculating a route for a path in a communications network including nodes and links for interconnecting the nodes. The system has a database for holding physical configuration information of the entirety of the network, and calculating means for assigning a number of SRLG IDs to each link group in accordance with a failure rate of the resource shared by the link group with reference to the database.

According to a third aspect of the present invention, there is provided a route calculating method for calculating routes for a working path and a standby path which have the same start point node and the same end point node in a communications network including nodes and links for interconnecting the nodes. The method includes the step of calculating the routes such that a minimum number of SRLG IDs duplicate between all links on the route of the working path and all links on the route of the standby path.

Another path calculating method according to the present invention comprises the step of calculating the routes for the working path and the standby path while increasing integer N one by one from zero in order under the constraint that N or less of duplications are permitted between SRLG IDs of all links on the route of the working path and SRLG IDs of all links on the route of the standby path, where N is an integer equal to or more than zero, and employing a route which is first found.

According to a fourth aspect of the present invention, there is provided a communications network system which includes nodes and links for interconnecting the nodes, in which a working path and a standby path are set to have the same start point node and the same end point node, and switches to the standby path when the working path fails. The communications network system includes means for assigning a number of SRLG IDs to the link group in accordance with a failure rate of the resource when setting link properties used in a path route calculation, and means for calculating routes for the working path and the standby path such that a minimum number of SRLG IDs duplicate between all links on the route of the working path and all links on the route of the standby path in the calculation of the routes.

According to a fifth aspect of the present invention, there is provided a communications network system which includes nodes and links for interconnecting the nodes, in which a working path and a standby path are set to have the same start point node and the same end point node, and is configured to switch to the standby path when the working path fails, wherein when routes of a standby path group corresponding to a certain working path group overlap in a certain section, the same resource is shared by the standby path group in this overlapping section. The system includes means for assigning a number of SRLG IDs to the link group in accordance with a failure rate of the resource when setting link properties used in a path route calculation, and means for permitting sharing of a resource when M or less of SRLG IDs duplicate among the routes of the working path group, in the sharing of the resource in the standby path group, where M is an integer equal to or more than one.

A first communications node according to the present invention is a communications node for calculating routes for a working path and a standby path to an end point node in a communications network, which has a database for storing SRLG IDs on a link-by-link basis, and calculating means for calculating the routes such that a minimum number of SRLG IDs duplicate between all links on the route of the working path and all links on the route of the standby path with reference to the database.

A second communications node according to the present invention is a communications node for calculating routes for a working path and a standby path to an end point node in a communications network, which has a database for storing SRLG IDs on a link-by-link basis, and means for calculating the routes for the working path and the standby path while increasing integer N one by one from zero in order with reference to the database, under the constraint that N or less of duplications are permitted between SRLG IDs of all links on the route of the working path and SRLG IDs of all links on the route of the standby path, where N is an integer equal to or more than zero, and employing a route which is first found.

A third communications node according to the present invention is a communications node for setting a working path and a standby path to an end point node, and switching to the standby path when the working path fails, which has means for assigning a number of SRLG IDs to the link group in accordance with a failure rate of the resource when setting link properties used in a path route calculation, and means for calculating routes for the working path and the standby path such that a minimum number of SRLG IDs duplicate between all links on the route of the working path and all links on the route of the standby path in the calculation of the routes.

A fourth communications node according to the present invention is a communications node for setting a working path and a standby path to an end point node, and configured to switch to the standby path when the working path fails, wherein when routes of a standby path group corresponding to a certain working path group overlap in a certain section, the same resource is shared by the standby path group in this overlapping section. The communications node has means for assigning a number of SRLG IDs to the link group in accordance with a failure rate of the resource when setting link properties used in a path route calculation, and means for permitting sharing of a resource when M or less of pieces of shared risk link group identification information duplicate among the routes of the working path group, in the sharing of the resource among the standby path group, where M is an integer equal to or more than one.

As described above, in the present invention, in setting link properties, when a link group shares a resource, the link group is assigned a number of SRLG ID's in accordance with a failure rate of the resource. For example, the link group is assigned a number of SRLG ID's in accordance with the failure rate. Also, in the present invention, in calculating routes for a working path and a standby path, the routes for the working path and the standby path are calculated while integer N is increased one by one from zero in order, under the constraint that N or less of duplications are permitted between SRLG IDs of all links on the route of the working path and SRLG IDs of all links on the route of the standby path, where N is an integer equal to or more than zero, and a route which is first found is employed. Further, in the present invention, when routes of a standby path group corresponding to a certain working path group overlap in a certain section, the sharing of a resource is permitted when M or less SRLG IDs duplicate among the routes of the working path group, where M is an integer equal to or more than one. In this way, the present invention can control the routes for the paths on reflection of a difference in failure rate among resources.

In the present invention, when routes are calculated for a working path and a standby path, it is possible to select routes which simultaneously fail with a lower probability. This is because a link group is assigned a number of SRLG IDs in accordance with, for example, in proportion to the failure rate of a resource, and in the route calculation, the routes are calculated for the working path and standby path such that a minimum number of SRLG ID's duplicate between all links on the route of the working path and all links on the route of the standby path.

Also, in the present invention, when a resource is shared among standby paths corresponding to a plurality of working paths, respectively, the resource can be shared among standby paths corresponding to a plurality of working paths which simultaneously fail with a lower probability. This is because a link group is assigned a number of SRLG IDs in accordance with, for example, in proportion to the failure rate of the resource, and for a determination as to whether or not the resource may be shared, duplication of M SRLG IDs is permitted among routes of working paths, where M is an integer equal to or more than one.

Further, in the present invention, for calculating a route for a path, a route can be selected such that the path fails with a lower probability. This is because a link group is assigned a number of SRLG IDs in accordance with, for example, in proportion to the failure rate of a resource, and in the route calculation, the route is calculated for the path to minimize the total number of SRLG IDs of all links on the route.

BRIEF DESCRIPTION OF THE DRAWINGS

FIG. 1 is a diagram illustrating an example of a logical configuration of a network to which the present invention is applied.

FIG. 2 is a diagram illustrating an example of the physical configuration of the network illustrated in FIG. 1.

FIG. 3 is a table showing sharing link groups which use resources and failure rates of the resources in the network illustrated in FIGS. 1 and 2 on a resource-by-resource basis.

DESCRIPTION OF REFERENCE NUMERALS 300, 310, 300A, 310A Nodes
301 Switch unit
302, 302A Node control units
303, 333 Protocol control units
334, 304 Topology databases
305 Control channel
306 Data channel
307 Resource management unit
320 Configuration management server
321 Network configuration database
322 Link information database
323 Processing unit
330 Integrated control device Best Mode for Carrying out the Invention Giving an example of a network having the logical configuration illustrated in FIG. 1, a description will be given of link property setting and route calculation based on the present invention. In FIG. 1, lines interconnecting nodes A to H indicate logical links. FIG. 2 illustrates the physical configuration of this network. The links are accommodated in pipe lines 101 to 120. In the following description, a link which connects node A with node B is described like link AB. For example, link AE which connects node A with node E passes through pipe lines 113, 114, 115 together with link AB, and this link AE further passes through pipe line 118. FIG. 3 shows link groups which pass through resources in the network of such a configuration on a resource-by-resource basis, and shows a correspondence table indicating a failure rate of each resource. Here, the resources are the respective pipe lines. It can be seen from the correspondence table shown in FIG. 3 that, for example, link GH alone passes through pipe line 101, link AB and link AE pass through pipe line 113, pipe lines 101, 102 have a failure rate of 10 ppm, and each of the remaining pipe lines has a failure rate of 3 ppm.

Figure 4:
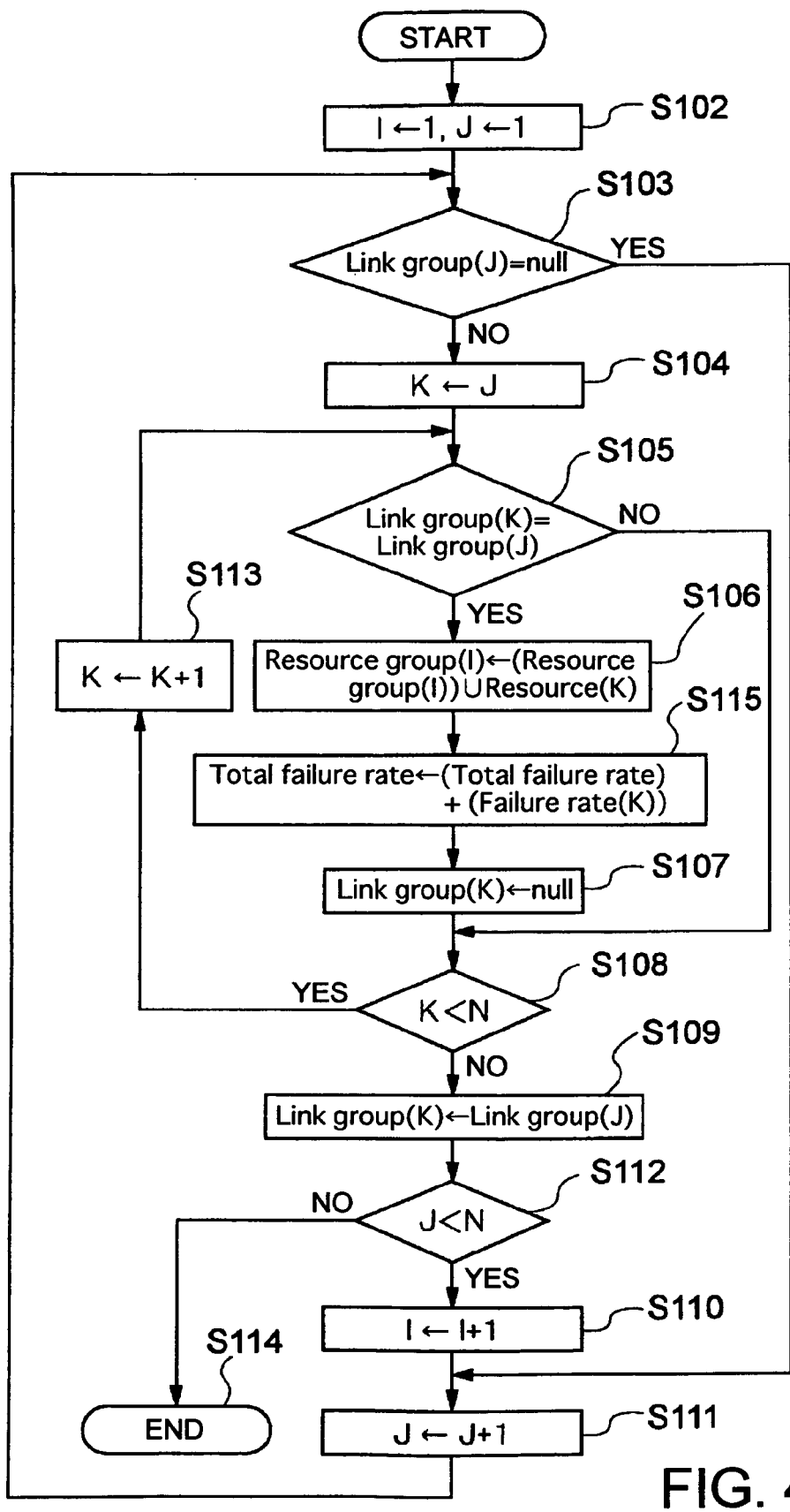
FIG. 4 is a flow chart illustrating a processing procedure of a link property setting method according to one embodiment of the present invention.
Figures 5, 6:
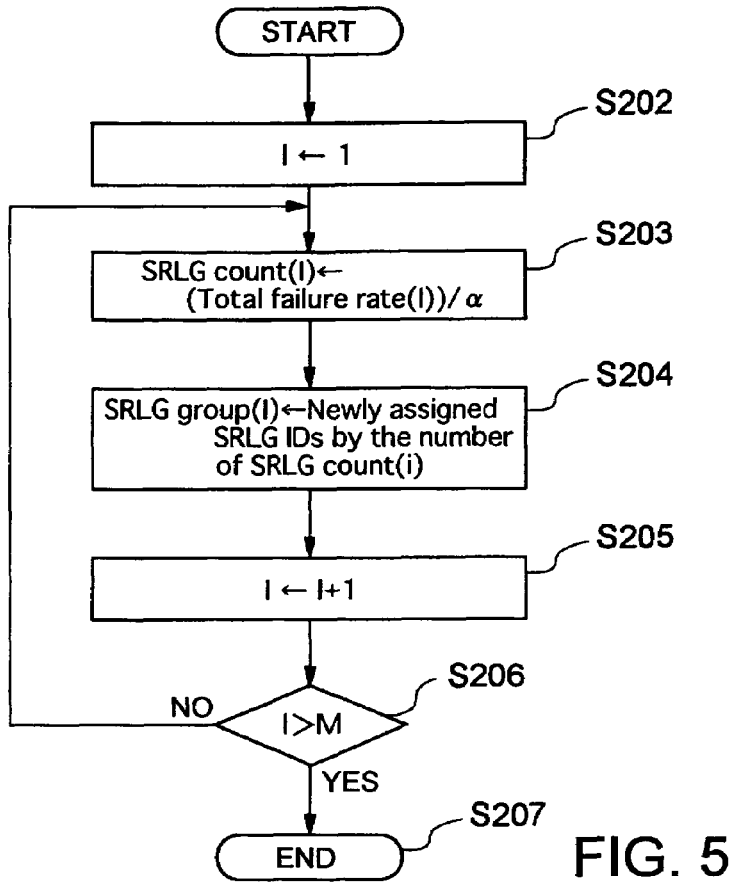
FIG. 5 is a flow chart illustrating a processing procedure of a link property setting method according to one embodiment.
FIG. 6 is a table showing a relationship among links, a total failure rate, an SRLG count, SRLGs to each resource in the network illustrated in FIGS. 1 and 2.

Assuming that the links passes through the respective pipe lines as shown in FIG. 3, and the respective pipe lines have the failure rates as shown in FIG. 3, a process illustrated in FIG. 4 is executed, and a process illustrated in FIG. 5 is further executed, resulting in a table as shown in FIG. 6.

First described is the process illustrated in the flow chart of FIG. 4. FIG. 4 illustrates a process executed by a link group in the table of FIG. 3 for extracting equal rows, and finding a logical OR, i.e., a joint set of resources in these rows, thereby integrating the extracted rows into one. Stated another way, this process finds a maximum set of resources shared by a link group, and finds a total of failure rates, i.e., a total failure rate for this maximum set of resources.

Assume that the table shown in FIG. 3 has the number of rows equal to N. At step 102, integers I, J are both set to one. Assume that a link group on a J-th row in the table shown in FIG. 3 is hereinafter labeled such as link group (J). At step S103, it is determined whether or not link group (J) is blank (null). When link group (J) is null, the process goes to step 111 without performing anything. At step 111, one is added to J, followed by the process returning to step S103.

When link group (J) is not null at step S103, integer K is substituted into J at step S104, and link group (K) is compared with link group (J) at step S105. When both the link groups are equal, i.e., when link group (K)=link group (J), a logical OR, i.e., a joint set of resource group (I) and resource (K) is found at step S106, and this is designated as new resource group (I). Resource group (I) has an initial value of null. At step S115, failure rate (K) is added to total failure rate (I), and this is designated as new total failure rate (I). Total failure rate (I) has an initial value of zero.

Next, at step S107, link group (K) is changed to null, followed by a transition to step S108. Also, when link group (K) is not equal to link group (J) at step S105, the control proceeds to step S108 as well.

At step S108, it is determined whether or not K is smaller than N. When K<N, one is added to K at step S113, followed by a transition to step S105. On the other hand, when K≧N at step S108, the value of link group (J) in the table of FIG. 3 is copied to link group (I) in the table of FIG. 6. Also, resource group (I) and total failure rate (I) at this time take values which should be described in entries of the resource group and total failure rate, respectively, on the I-th row of the table in FIG. 6. Subsequently, it is determined at step S112 whether or not J is smaller than N. Here, when J=N, the process illustrated in FIG. 4 is terminated, whereas when J<N, one is added to I at step S110, one is added to J at step S111, and the control then returns to step S103.

By repeating the foregoing process until J becomes equal to N, values are stored in respective entries of a first column (link group), a second column (resource group), and a third column (total failure rate) of the table shown in FIG. 6, thus completing the first column, second column, and third column.

Next, a description will be given of a process illustrated in a flow chart of FIG. 5. By executing the process illustrated in FIG. 5, values are stored in respective entries of a fourth column (SRLG count) and a fifth column (SRLG group) of the table shown in FIG. 6, finally completing the table shown in FIG. 6.

In the following description, the number of rows in the table shown in FIG. 6 is set to M.

As illustrated in FIG. 5, first, I is set to one at step S202, total failure rate (I) is divided by α at step S203, and the resulting residue is set to SRLG count (I). However, the residue is handled such that SRLG count (I) takes an integer by dropping the fractional portion of the residue. Here, α is a constant for determining that one SRLG should be assigned to which level of the failure rate. In the example of the table shown in FIG. 6, α is set to 2 ppm.

Next, at step S204, a number of SRLG IDs equal to SRLG count (I) are newly driven away. This results in the value of SRLG group (I). Subsequently, one is added to I at step S205, and it is determined at step S206 whether or not I is larger than M. When I>M, the process is terminated here, whereas when I≧M, the process returns to step S203 to repeat the processing described above.

By repeating the foregoing process until I becomes larger than M, the table shown in FIG. 6 is fully completed.

By the way, the table shown in FIG. 6 shows the link group and SRLG group for each resource group, so that the link groups duplicate. Accordingly, a process is executed for each link to find an SRLG group to which the link belongs. The result of the process is a table shown in FIG. 7. The table shown in FIG. 7 presents nothing but a set of SRLGs to which all links belong in the network illustrated in FIGS. 1 and 2.

Figures 7, 8:
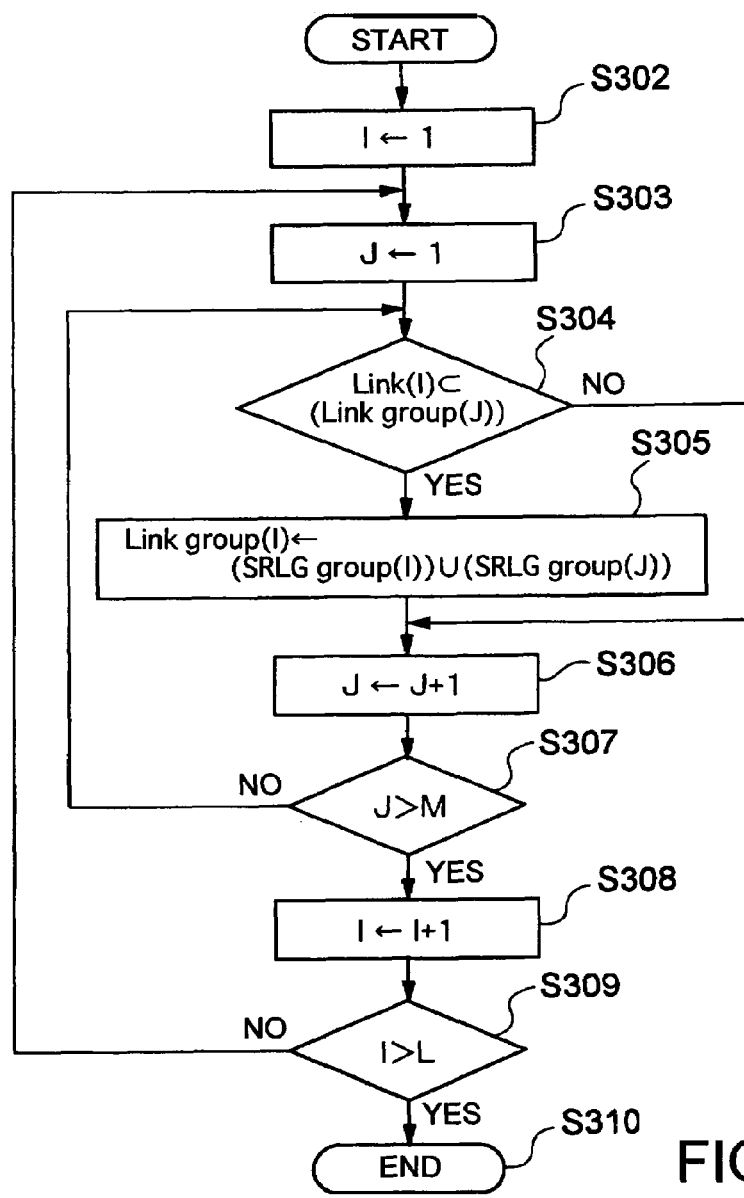
FIG. 7 is a table showing a relationship of SRLGs to each link in the network illustrated in FIGS. 1 and 2.
FIG. 8 is a flow chart illustrating a specific process for finding SRLGs for each link.

The first column of the table in FIG. 7 enumerates all links. Here, the number of rows of the table shown in FIG. 7, i.e., the total number of links is represented by L. Then, as a process illustrated in a flow chart of FIG. 8 is applied on the basis of the table shown in FIG. 6, the second column (SRLG group) is produced in the table shown in FIG. 7. In the following, the process for finding an SRLG group for each link will be described with reference to FIG. 8.

First, I is set to one at step S302, and J is also set to one at step S303. Next, it is examined at step S304 whether or not link (I) in the table shown in FIG. 7 is included in link group (J) of the table shown in FIG. 6. When link (I) is included in link group (J), a logical OR, i.e., a joint set of SRLG group (I) in the table shown in FIG. 7 and SRLG group (J) in the table shown in FIG. 6 is found at step S305, and designated as a new value for SRLG group (I) in the table shown in FIG. 7. Subsequently, the process goes to step S306. SRLG group (I) in the table shown in FIG. 7 has an initial value of null. When link (I) is not included in link group (J) at step S304, the process goes to step S306 as well.

One is added to J at step S306, and it is determined at step S307 whether or not J exceeds M. Here, when J≦M, the process returns to step S304, where link (I) in the table of FIG. 7 is compared with link group (J) in the table of FIG. 6. Such processing is repeated until J>M stands at step S307, at which time the process goes to step S308. Upon transition to step S308, SRLG group (I) has been found.

One is added to I at step S308, and then, it is determined at step S309 whether or not I exceeds L. When I≦L, the process returns to step S303, where processing is executed for finding SRLG group (I) for new I. By repeating such processing until I>L stands, SRLG groups (I) are found for all I from one to L. Subsequently, at step S310, all the processing is terminated.

The table shown in FIG. 7, thus completed, presents nothing but a set of SRLGs to which all links in the network illustrated in FIGS. 1 and 2 belong.

Figure 9:
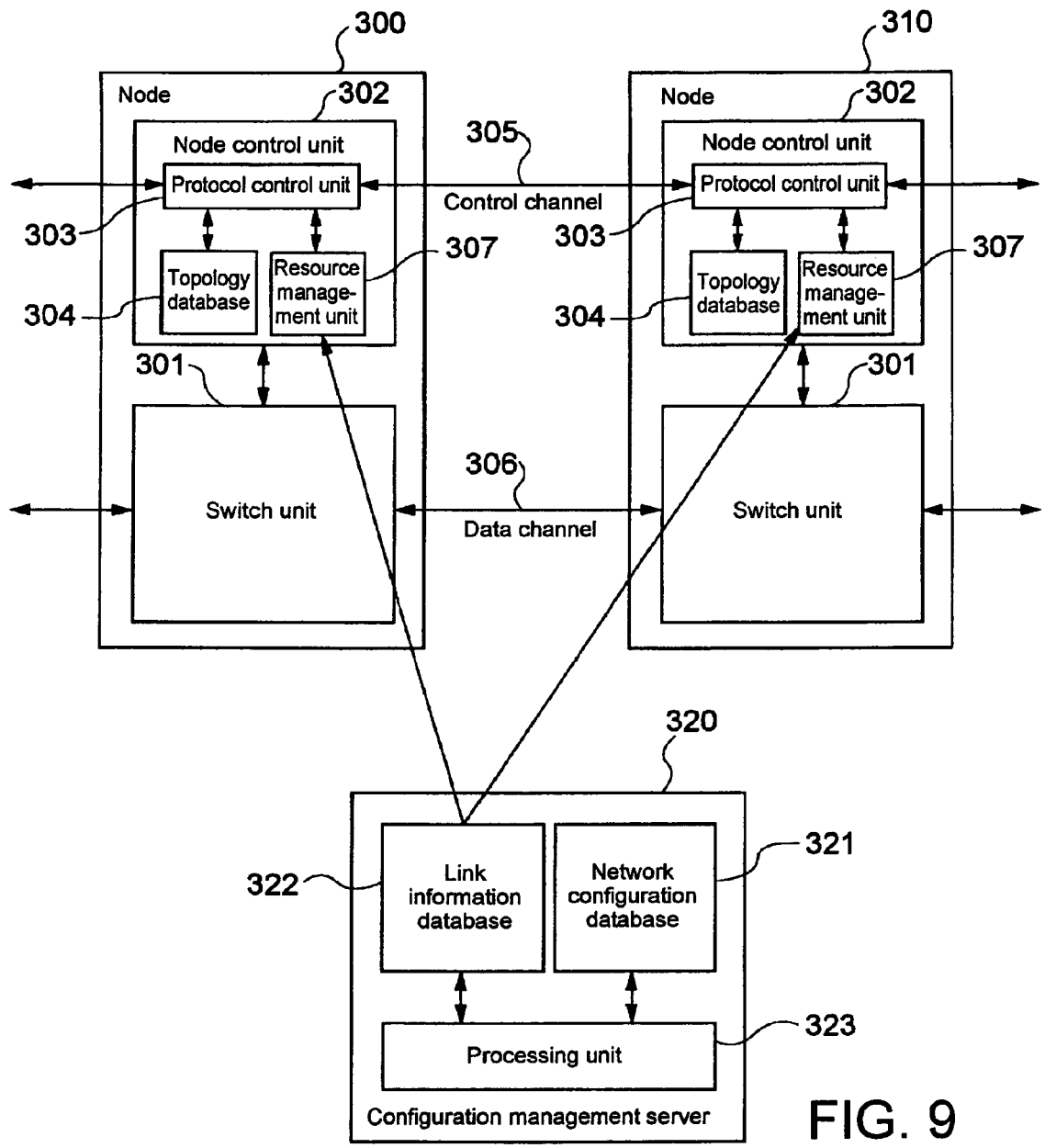
FIG. 9 is a block diagram illustrating the configuration of respective components in one embodiment.

In the following, a description will be given of a method of calculating routes for a working path and a standby path by distributed control based on the table shown in FIG. 7, which has been determined in the manner described above. FIG. 9 illustrates the configuration of nodes 300, 310 and configuration management server 320 installed in a network in this embodiment. Since nodes 300, 310 are in the same configuration, the configuration of node 300 will be described as representative. While only two nodes 300, 310 are shown in FIG. 9, the number of nodes included in the network may be three or more, as a matter of course. A node in the same configuration as node 300 is used, for example, for any of eight nodes A to H in the network illustrated in FIG. 1. Configuration management server 320, though not shown in FIG. 1 or 2, is arranged in the network such that it can communicate with each of the nodes in the network.

Node 300 is generally comprised of switch unit 301 and node control unit 302. Switch unit 301 is connected to switch unit 301 of a neighboring node through data channel 306, while node control unit 302 is connected to node control unit 302 of the neighboring node through control channel 305. Between nodes, user data is transmitted using data channel 306. Control channel 305 is used for communications of control protocols such as a routing protocol, a signaling protocol and the like. Node control unit 302 comprises control channel protocol control unit 303, topology database 304, and resource management unit 307.

Configuration management server 320 comprises network configuration database 321, link information database 322, and processing unit 323. Network configuration database 321 holds physical configuration information of the entire network. The information in the table shown in FIG. 3 is also stored in network configuration database 321. Processing unit 323 executes the processes illustrated in the flow charts of FIGS. 4, 5, and 8 to create the table shown in FIG. 7 from the table shown in FIG. 3. Information in the created table shown in FIG. 7 is stored in link information database 322. Link information database 322 also stores such information as all link IDs, initial values of unused bands, metrics and the like, in addition to the information in the table shown in FIG. 7. The unused band refers to a band which is not used by any path in an associated link, and its initial value is a maximum bandwidth of the link. The metric is a link cost, and the length of the link, or a fixed value is typically used therefor. Such information is provided to resource management unit 307 in node control unit 302 of each node when each node is started.

Resource management unit 307 stores IDs, unused bands, metrics, SRLG groups and the like of all links in contact with the own node. For example, in node A in the network shown in FIG. 1, resource management unit 307 holds IDs, unused bands, metrics, and SRLG groups of links AB, AD, AG. The unused band varies to the accompaniment with a setting and deletion of a path. Resource management unit 307 holds the latest unused bands at all times. The information held in resource management unit 307 is periodically advertised (broadcast) to all other nodes through control channel 305 from protocol control unit 303. A node which has received the advertisement stores its information in topology database 304. Therefore, all the nodes in the network hold information of all links in the network, corresponding SRLG groups, and unused bands in the topology database.

Figure 10:
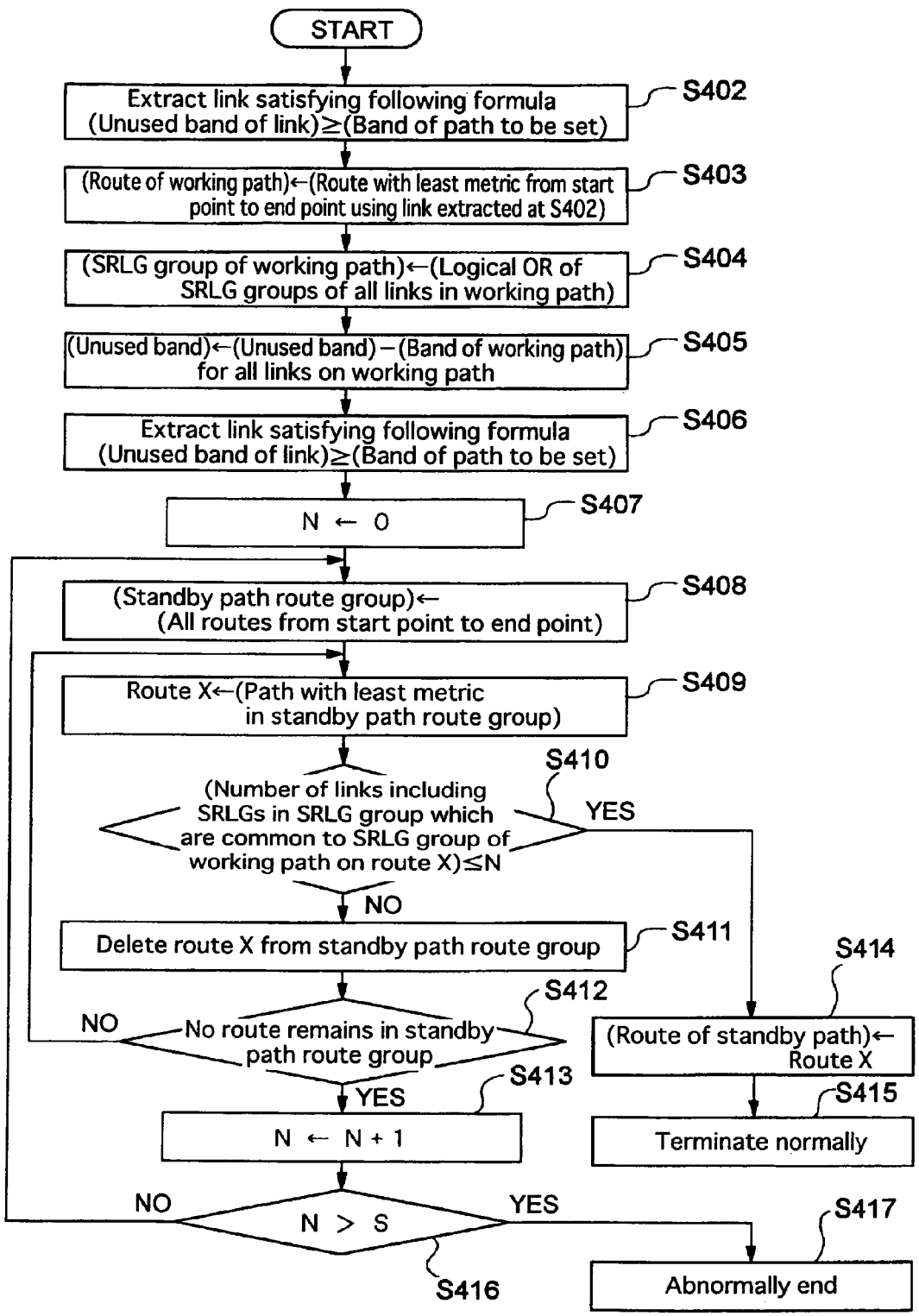
FIG. 10 is a flow chart illustrating specific operations for a route calculation in one embodiment.

A path setting request is given to protocol control unit 303 of a path start point node. This setting request includes information such as a start point node, an end point node, a path band, and the like. Upon receipt of the setting request, protocol control unit 303 calculates routes for a working path and a standby path. A flow chart illustrated in FIG. 10 represents this calculation procedure. In this route calculation, a route which has the smallest total metric from the start point node to the end point node is selected for a route of the working path, while a route which includes a least possible number of SRLGs common to the route of the working path and has the smallest total metric from the start point node to the end point node among the route of the least possible number of SRLGs is selected for a route of the standby path. In calculating the route for the standby path, the route is searched in a range in which the number of SRLGs common to the route of the working path is equal to or less than a fixed value S. If such a route cannot be found, the calculation for the route of the standby path abnormally ends. Details will be described below.

First, at step S402, all links which have unused bands equal to or more than the band of a path to be set are extracted from topology database 304. Protocol control unit 303 calculates the path which has the smallest total metric from the start point node to the end point node, using the links extracted at step S402, and designates it as a route for the working path at step S403. Here, a Dijkstra method or the like can be used by way of example. Next, protocol control unit 303 calculates a logical OR, i.e., a joint set of SRLG groups of all links included in the route of the working path, and designates this as a working path SRLG group. Also, at step S405, protocol control unit 303 subtracts the band of the working path from the unused band of all the links included in the route of the working path.

Next, a transition is made to the calculation of a route for the standby path. At step S406, protocol control unit 303 again extracts all links which have unused bands equal to or more than a band of a path to be set, and sets integer N to zero at step S407. At step S408, protocol control unit 303 finds all routes from the start point node to the end point node using the links extracted at step S406, and designates them as a standby path route group. Next, at step S409, protocol control unit 303 selects the route which has the smallest total metric from the start point node to the end point node from the standby path route group, and designates this as route X.

At step S410, protocol control unit 303 searches all links included in route X for those links which include, in their SRLG group, SRLGs common to those included in the SRLG group of the working path, and compares the number of links which satisfy such a condition with N. When the number of links which satisfy the condition is equal to or less than N, route X is designated as a route of the standby path at step S414, and the process is subsequently terminated normally at step S415. Since N is zero in an initial state, the path having the smallest total metric is selected as the route of the standby path if it does not share any SRLG with the route of the working path.

On the other hand, when the number of links which satisfy the condition is larger than N, protocol control unit 303 deletes route X from the standby path route group at step S411, and determines at step S412 whether or not any route remains in the standby path route group. Here, if there is a route remaining in the standby path route group, the process returns to step S409, where protocol control unit 303 selects the path which has the smallest total metric from among the remaining routes as new route X. When a route which satisfies the condition of step S410 is found while the processing is repeated from step S409 to S412, this is designated as the route of the standby path. If routes are exhausted in the standby path route group at step S412 without finding any route which satisfies the condition of step S410, the process goes from step S412 to step S413, where one is added to N, and N is compared with S at step S414. Here, when N≦S, the process returns to step S408, where the foregoing processing is repeated. In other words, the condition at step S410 is relieved by increasing N, followed by a search again made for a route which satisfies the condition of step S410 from all the routes in the standby path route group.

When a route which satisfies the condition of step S410 is found in course of repetitions from steps S408 to S416, this serves as the route of the standby path. Accordingly, selected as the route of the standby path is the route which has the least number of SRLGs common to the route of the working path and further has the smallest total metric from the start point to the end point among the route has the least number of SRLGs. If there is not any path found which satisfies the condition of step S410 in a range in which N is equal to or less than S, i.e., when N>S at step 416, the process goes to step S417, where the calculation of a route for the standby path abnormally ends.

Figure 11:
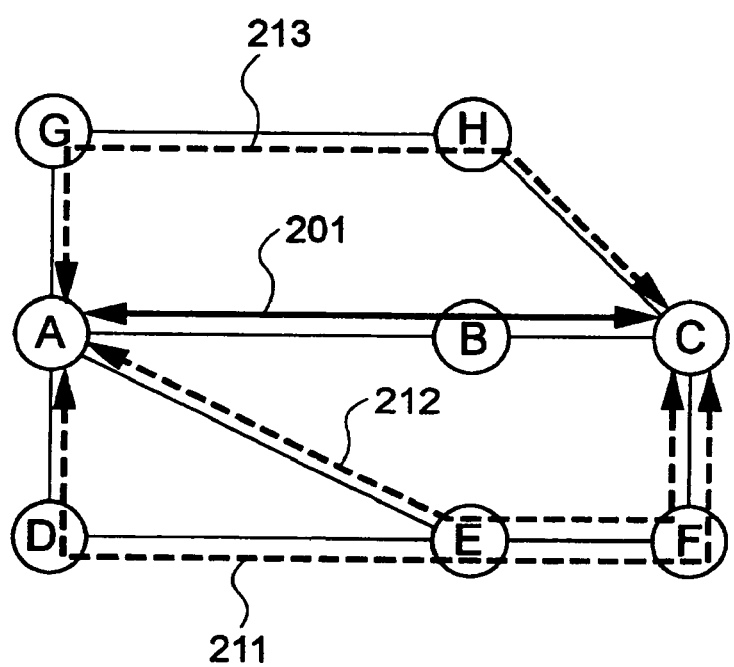
FIG. 11 is a diagram showing routes of paths in the network illustrated in FIGS. 1 and 2.

A specific example of using the path route calculation as described above will be described with reference to FIG. 11. While a network illustrated in FIG. 11 is the same as the network illustrated in FIG. 1, some routes are shown in FIG. 11. Assume herein that node A is requested to set a path which has node A specified for a start point, and node C specified for an end point.

As the process described using FIG. 10 is executed in a state in which all the links have the unused bands equal to or more than the band of the path, route 201 can be found as a route for the working path which passes nodes A→B→C in this order. The working path is set by performing signaling along route 201 using control channel 305.

Next, a route is calculated for the standby path. As a result, since route 211 represented by A→D→E→F→C can be found as the standby path, the standby path is set by performing signaling along route 211. Route 211 is a route which does not at all share SRLGs with route 201. Therefore, even if the working path fails due to a trouble in one resource, the network can be recovered without fail by switching to the standby path.

Suppose herein that link AD has an unused band which is less than the band of the set path. In this event, route 211 cannot be used as a route for the standby path. Since there is not any route which does not at all share SRLGs with route 201 of the working path, route 213 (A→G→H→C) which shares one SRLG with working path 201 is selected as a route for the standby path. In this event, if the working path fails due to a trouble on pipe line 116, the network cannot be recovered even if the working path is switched to the standby path. However, the network can be recovered without fail from a failure due to a trouble in one resource other than that.

Suppose herein that link CH also has an unused band which is less than the band of the set path in addition to link AD. In this event, path 212 (A→E→F→C) which shares four SRLGs with current route 201 is selected as a route for the standby path. In this event, if the working path fails due to a trouble in any of pipe lines 113, 114, 115, the network cannot be recovered even if the working path is switched to the standby path. Any of pipe lines 113, 114, 115 fails with a probability of 9 ppm, which is three times as much as the probability of 3 ppm with which pipe line 116 fails.

As described above, according to this embodiment, by reflecting a resource failure rate to the number of SRLGs to be assigned, it is possible to select routes for a working path and a standby path which simultaneously fail with a lowest possible probability. In the prior art, since only one SRLG is assigned to the entirety of three pipe lines 113, 114, 115, it is unknown whether route 212 or route 213 is selected if route 211 cannot be selected as a route for the standby path. If one SRLG is assigned to each of pipe lines 113, 114, 115, with the application of the route calculation algorithm illustrated in FIG. 10, route 213 can be selected in preference to route 213 as a route for the standby path.

However, this cannot yet be said to be sufficient. This is because, supposing that each of pipe lines 113, 114, 115 presents a failure rate of 0.5 ppm, route 212 should be selected in preference to route 213 in this event, whereas if one SRLG is assigned to one pipe line, this is not the case. Only when SRLGs are assigned by the method shown in this embodiment, it is possible to correctly select a standby path route with a lower probability of simultaneous failures for all cases described above. While the foregoing description has been given of a scenario in which three pipe lines with a failure rate of 3 ppm are arranged on link AB, the result is completely the same even when there is one pipe line which has a failure rate of 9 ppm.

While this embodiment finds the route which has the smallest total metric from a start point to an end point, while satisfying various conditions for the calculation of routes for a working path and a standby path, it is possible to alternatively find the route which requires the least total number of SRLGs. Alternatively, when there are a plurality of routes which require the least total amount of metrics, it is possible to select one which requires the least total number of SRLGs. Thereby, it is possible to select a route which presents a lowest possible failure rate itself.

Figure 12:
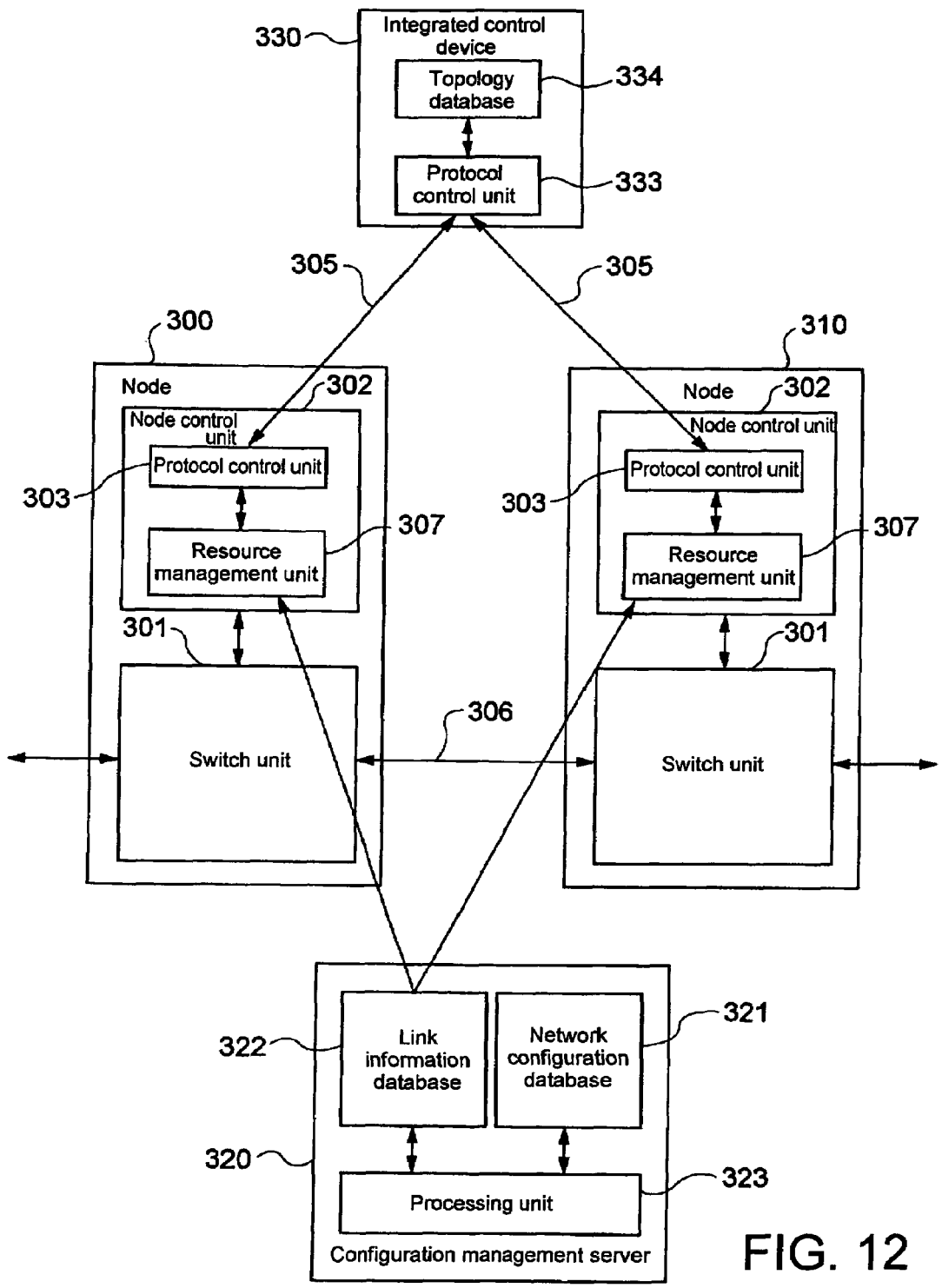
FIG. 12 is a block diagram illustrating the configuration of respective components according to another embodiment of the present invention.

Next, a description will be given of another embodiment of the present invention. Shown herein is an integrated control network to which the present invention is applied. FIG. 12 illustrates the configuration of the integrated control network as well as the configurations of nodes 300A, 310A, configuration management server 320, and integrated controller 330 which are provided within the network. Since nodes 300A, 310A are in the same configuration, the configuration of node 300A will be described as representative. While FIG. 12 shows only two nodes 300A, 310A, the number of nodes included in the network may be three or more, as a matter of course. A node in the same configuration as node 300A can be used for any of eight nodes A to H in the network illustrated in FIG. 1.

Configuration management server 320 used here is similar to that shown in FIG. 9. Configuration management server 320 is disposed within the network such that it can communicate with each of the nodes in the network.

Node 300A is generally comprised of switch unit 301 and node control unit 302A, and is similar to node 300 shown in FIG. 9. However, it differs from node 300 in that it does not comprise the topology database. Specifically, node control unit 302A comprises protocol control unit 303 and resource management unit 307.

Integrated controller 330 comprises protocol control unit 333 and topology database 334. Integrated controller 330 is disposed within the network such that it can communicate with each of the nodes in the network through control channel 305. Specifically, protocol control unit 303 of each node is connected to protocol control unit 333 of integrated controller 330 through control channel 305.

Each node holds information such as link IDs, unreserved bands, metrics, SRLGs group and the like of links in contact with the node itself in resource management unit 307. The information is given from link information database 322 of configuration management server 320 when the node is started. Information in resource management unit 307 is periodically sent to protocol control unit 333 of integrated controller 330 through control channel 305 from protocol control unit 303.

Protocol control unit 333 of integrated controller 330 stores information sent from each node in topology database 334. Therefore, topology database 334 holds information such as link IDs, unreserved bands, metrics, SRLG groups and the like of all links in the network.

In this embodiment, procedures for creating the table shown in FIG. 3, the table shown in FIG. 6, and the table shown in FIG. 7 are similar to those in the previously described embodiment. Specifically, a path setting request is given to protocol control unit 333 of integrated controller 330. As a result, protocol control unit 333 calculates routes for a working path and a standby path using the route calculation algorithm illustrated in FIG. 10 with reference to the information in topology database 334. The following procedure is completely the same as that in the previously described embodiment. This embodiment can also provide completely similar effects to the previously described embodiment.

The link property setting method and route calculating method described above can also be implemented by reading a computer program for implementing them into a computer and executing the program. The program for performing the link property setting or route calculation is read into the computer by a recording medium such as a CD-ROM or through a network. Such a computer generally comprises a CPU, a hard disk drive for storing programs and data, a main memory, input devices such as a keyboard, a mouse and the like, a display device such as a CRT, a liquid crystal display or the like, a reader for reading a recording medium such as a CD-ROM, and a communication interface which interfaces with a network. In this computer, the recording medium which stores the program for executing the link property setting and/or route calculation is mounted on the reader and the program is read from the recording medium for storage in the hard disk drive, or such a program is downloaded from a network for storage in the hard disk drive, and subsequently, the program stored in the hard disk drive is executed by the CPU to execute the aforementioned link property setting and/or route calculation.

Accordingly, the foregoing program, a recording medium which stores such a program, and a program product comprising such a program are also included in the scope of the present invention.

A computer program included in the scope of the present invention is, for example, a program for causing a computer to execute processing for setting shared risk link group identification information which is one of link properties used for calculating a route for a path in a communications network including nodes and links for interconnecting the nodes, and indicates a link group which shares a resource, wherein the program causes the computer to execute processing for assigning a number of pieces of the shared risk link group identification information to each link group in accordance with a failure rate of the resource shared by the link group. Alternatively, a computer program may be a program for causing a computer to execute processing for calculating routes for a working path and a standby path which have the same start point node and the same end point node in a communications network including nodes and links for interconnecting the nodes, where the program causes the computer to execute processing for calculating the routes such that a minimum number of pieces of shared risk link group identification information indicative of a link group which shares a resource duplicate between all links on the route of the working path and all links on the route of the standby path. Alternatively, a computer program may be a program for causing a computer to execute processing for calculating routes for a working path and a standby path which have the same start point node and the same end point node in a communications network including nodes and links for interconnecting the nodes, where the program causes the computer to execute processing for calculating the routes for the working path and the standby path while increasing integer N one by one from zero in order under the constraint that N or less of duplications are permitted between shared risk link group identification information indicative of a link group which shares a resource of all links on the route of the working path and shared risk link group identification information of all links on the route of the standby path, where N is an integer equal to or more than zero, and processing for employing a route which is first found.

The invention claimed is:

1. A link property setting method of setting shared risk link group identification information indicative of a link group which shares a resource in a communications network, the method comprising the steps of:
   selecting a plurality of link groups each of which shares at least one resource; and
   assigning by a processing unit, to each link group, at least one piece of said shared risk link group identification information in accordance with a failure rate of said resource shared by said link group,
   wherein said step of assigning includes the steps of:
   finding a maximum set of resources shared by said link group;
   calculating a total failure rate for the maximum set of said resources; and
   assigning at least one piece of shared risk link group identification information to said link group in proportion to said total failure rate.

2. A link property setting system for setting shared risk link group identification information indicative of a link group which shares a resource in a communications network, the system comprising:
   a database for holding physical configuration information of said network; and
   calculating means for assigning at least one piece of said shared risk link group identification information to each link group in accordance with a failure rate of said resource shared by said link group with reference to said database,
   wherein said calculating means finds a maximum set of resources shared by said link group, calculates a total failure rate for the maximum set of said resources, and assigns at least one piece of shared risk link group identification information to each link group in proportion to said total failure rate.

3. A computer readable recording medium which stores a program for causing a computer to execute processing for setting shared risk link group identification information indicative of a link group which shares a resource in a communications network, said program causing said computer to execute:
   processing for selecting a plurality of link groups each of which shares at least one resource; and
   processing for assigning, for each link group, at least one piece of the shared risk link group identification information to a link group in accordance with a failure rate of the resource shared by the link group, wherein the processing for assigning includes the steps of:
finding a maximum set of resources shared by said link group;
calculating a total failure rate for the maximum set of said resources; and
assigning at least one piece of shared risk link group identification information to said link group in proportion to said total failure rate.

* * * * *